United States Patent [19]
Ratan et al.

[11] Patent Number: 5,646,847
[45] Date of Patent: Jul. 8, 1997

[54] UNIVERSAL THRUSTER SELECTION LOGIC FOR SPACECRAFT ATTITUDE CONTROL

[75] Inventors: Santosh Ratan, Lawrenceville; Neil Evan Goodzeit, Princeton, both of N.J.

[73] Assignee: Martin Marietta Corp., East Windsor, N.J.

[21] Appl. No.: 519,442

[22] Filed: Aug. 25, 1995

[51] Int. Cl.$^6$ ................................................. B64G 1/26
[52] U.S. Cl. ........................ 364/424.013; 364/459; 244/164; 244/169; 244/171
[58] Field of Search ................... 364/424.012, 424.013, 364/459; 244/158 R, 164, 169, 171, 3.21

[56] References Cited

U.S. PATENT DOCUMENTS

| | | | |
|---|---|---|---|
| 3,866,025 | 2/1975 | Cavanagh | 364/459 |
| 4,537,375 | 8/1985 | Chan | 244/171 |
| 4,599,697 | 7/1986 | Chan et al. | 244/169 |
| 4,848,706 | 7/1989 | Garg et al. | 364/459 |
| 4,961,551 | 10/1990 | Rosen | 244/164 |
| 5,130,931 | 7/1992 | Paluszek et al. | 364/459 |
| 5,140,525 | 8/1992 | Shankar et al. | 364/459 |
| 5,310,143 | 5/1994 | Yocum et al. | 244/164 |
| 5,335,179 | 8/1994 | Boka et al. | 364/459 |
| 5,400,252 | 3/1995 | Kazimi et al. | 364/459 |

*Primary Examiner*—Gary Chin
*Attorney, Agent, or Firm*—W. H. Meise; C. A. Berard; S. A. Young

[57] ABSTRACT

A three-axis stabilized spacecraft includes a plurality of primary attitude control thrusters, the torque vectors of which lie in, or parallel to a primary plane. It also includes at least two more secondary attitude control thrusters, the torque vectors of which lie in a secondary plane which is not parallel to the primary plane. The control system produces attitude error signals, which are processed with a PID characteristic to produce impulse demand signals, all in known fashion. The impulse demand signals are transformed into an auxiliary coordinate system, in which two of the three auxiliary axes lie in the primary plane, and the third is orthogonal thereto. One of the secondary thrusters is selected, which has, along the third auxiliary axis, the largest torque magnitude and the same sign as the transformed impulse demand. The augmented impulse demand in the primary plane is determined, and the two primary thrusters are selected whose torque vectors in the primary plane bound the augmented impulse demand. The selected primary thrusters and the selected secondary thruster are fired with a pulse width which provides the desired impulse.

4 Claims, 5 Drawing Sheets

UNIVERSAL THRUSTER SELECTION LOGIC FOR SPACECRAFT ATTITUDE CONTROL

FIELD OF THE INVENTION

This invention relates to attitude control systems for spacecraft, and more particularly to attitude control systems for three-axis stabilized spacecraft.

BACKGROUND OF THE INVENTION

Three-axis stabilized spacecraft are often used for communication satellite purposes. The three-axis stabilization system ultimately exercises control over the attitude by means of chemical thrusters located on the spacecraft. Various forms of thruster control have been proposed and used. Some prior art systems use pseudo-inverse thruster selection logic, as described in U.S. Pat. No. 5,140,525, issued Aug. 18, 1992 in the name of Shankar et al. For some purposes, the pseudo inverse system may not be optimum, because under some conditions it may require that the thrusters be available in pairs, which produce approximately equal and opposite torques about the center of mass of the spacecraft. Due to payload constraints, or due to movement of the center of mass of the spacecraft while in orbit, the thruster configuration may not meet this condition. In addition, when one thruster of a pair must be canted away from its nominal thrust direction to minimize plume impingement on another portion of the spacecraft, the other thruster of the pair is also desirably canted in the opposite direction, even though it may not be required for plume impingement minimization. This, in turn, may reduce the thrust efficiency. An improved method is desired for operating a spacecraft in those cases in which thrusters are asymmetrically disposed about the center of mass.

SUMMARY OF THE INVENTION

A method for attitude control of a spacecraft, where the spacecraft includes at least five attitude control thrusters, which are located about the spacecraft in a manner such that a first set of at least three primary ones of the thrusters have their torque vector directions lying approximately in a primary plane. The remaining attitude control thrusters, constituting a set of secondary thrusters, have their torque vector directions lying approximately in the secondary plane, which is not parallel with the primary plane. In a first embodiment of the invention, the primary and secondary planes are mutually orthogonal, and correspond to the spacecraft anti-Earth and South faces. The method includes the steps of sensing the current or present attitude of the spacecraft, to produce attitude-representative signals, and taking the difference between the attitude-representative signals and desired-attitude signals representing the desired attitude of the spacecraft, to produce attitude error signals. The attitude error signals are applied to a controller having at least a proportional characteristic, for generating impulse demand signals representing impulse demand along each of three mutually orthogonal principal axes. In a preferred embodiment of the invention, the controller has at least a proportional (P) characteristic. The components of the impulse demand along the three principal axes are transformed into an impulse demand along a set of three mutually orthogonal auxiliary axes, two of which lie in the primary plane, and a third of which is normal to the primary plane. One of the thrusters of the set of secondary thrusters is selected, whose torque vector component along the third auxiliary axis has the same sign as the transformed impulse demand along that axis. The augmented impulse demand in the primary plane is calculated by $$\begin{bmatrix} I_1 \\ I_2 \end{bmatrix}_{aug} = \begin{bmatrix} I_1 \\ I_2 \end{bmatrix} - \begin{bmatrix} T_{t1} \\ T_{t2} \end{bmatrix} \frac{I_3}{T_{t3}} \quad (1)$$

where:

$I_1$ is the component of the transformed impulse demand along the first auxiliary axis;

$I_2$ is the component of the transformed impulse demand along the second auxiliary axis;

$I_3$ is the component of the transformed impulse demand along the third auxiliary axis;

$T_{t1}$ is the torque vector along the first auxiliary axis of the selected secondary thruster;

$T_{t2}$ is the torque vector along the second auxiliary axis of the selected secondary thruster; and $T_{t3}$ is the torque vector along the third auxiliary axis of the selected secondary thruster; and the subscript "aug" identifies the augmented impulse demand vector. First and second adjacent primary thrusters of the set of primary thrusters are selected. The selected adjacent primary thrusters are those whose torque vectors in the primary plane most closely bound the augmented impulse demand in the primary plane. The pulse widths required for the first and second adjacent primary thrusters and the selected secondary thruster are calculated to produce the impulse demand, according to $$\begin{bmatrix} PW_f \\ PW_s \\ PW_t \end{bmatrix} = M^{-1} \begin{bmatrix} I_1 \\ I_2 \\ I_3 \end{bmatrix} \quad (2)$$

where;

$PW_f$ is the pulse width of the selected first adjacent primary thruster;

$PW_s$ is the pulse width of the selected second adjacent primary thruster;

$PW_t$ is the pulse width of the selected secondary thruster;

$M^{-1}$ is the inverse of matrix M, and matrix M is given by $$M = \begin{bmatrix} T_{f1} & T_{s1} & T_{t1} \\ T_{f2} & T_{s2} & T_{t2} \\ T_{f3} & T_{s3} & T_{t3} \end{bmatrix} \quad (3)$$

where the first column of matrix M is the torque vector of the selected first primary adjacent thruster along the first, second and third auxiliary axes, the second column of matrix M is the torque vector of the selected second adjacent primary thruster along the first, second and third auxiliary axes, and the third column of matrix M is the torque vector of the selected secondary thruster along the first, second and third auxiliary axes. The calculated pulse widths are applied to the selected first and second primary thrusters and to the selected secondary thruster for torquing the spacecraft for attitude control. In one embodiment of the invention, the number of thrusters in the primary plane is four, and the number of thrusters in the secondary plane is two. In another embodiment, the number of thrusters in the secondary plane is at least three.

DESCRIPTION OF THE INVENTION

Figure 1A:
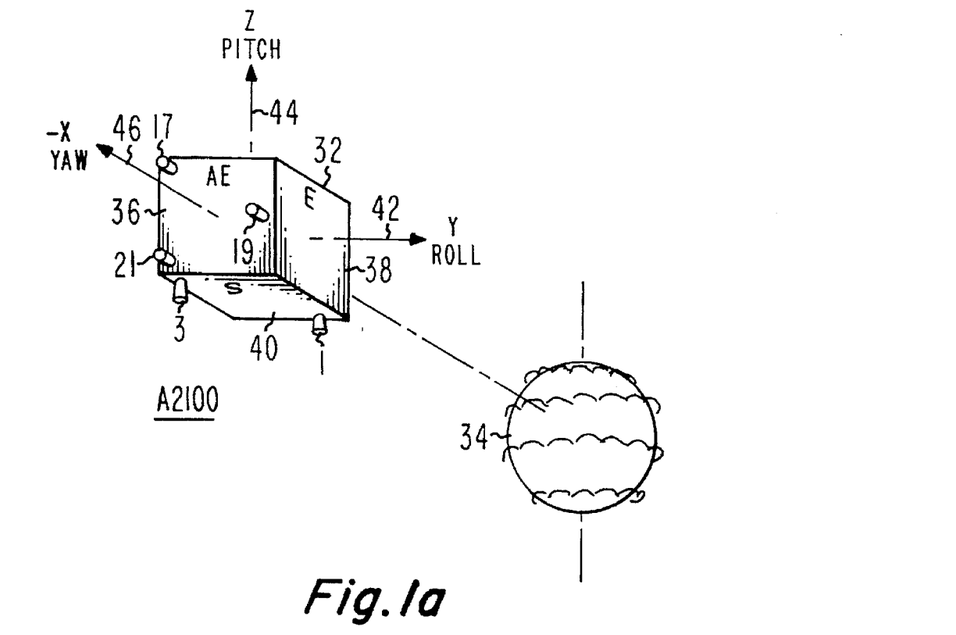
FIG. 1a is a simplified perspective or isometric view of a three-axis stabilized spacecraft, illustrating the orientation of the various faces of the spacecraft and their relationship to the roll, pitch and yaw axes.

In FIG. 1a, a three-axis stabilized spacecraft A2100 including a body 32 that orbits in a roughly equatorial plane about Earth 34. As illustrated, body 32 is a parallelopiped including an East face 38, a South face 40, and an anti-Earth (AE) face 36, oriented orthogonal to orbit roll, pitch and yaw axes 42, 44, and 46, respectively. In the particular embodiment of the invention illustrated in FIG. 1a, the anti-Earth face 36 has three thrusters 17, 19, and 21 attached thereto, with their thrust axes approximately normal to (orthogonal to) face 36, and South face 40 has two thrusters, namely thrusters 1 and 3, affixed thereto, with their thrust axes normal to face 32.

Figure 1B:
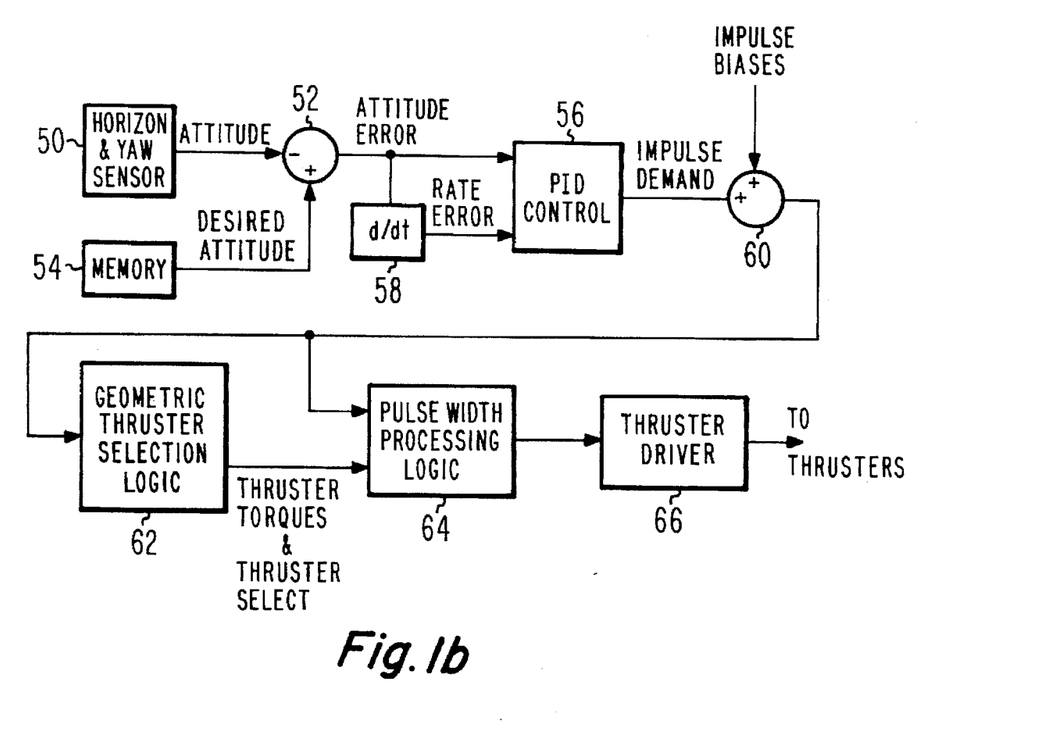
FIG. 1b is a simplified block diagram of an attitude control system which may be used in the arrangement including the invention.

FIG. 1b is a simplified block diagram of an attitude control system which may be used in conjunction with the invention. In FIG. 1b, horizon and yaw attitude sensors are illustrated together as a block 50. Attitude-representative signals produced by block 50 are applied to the inverting input port of a differencing circuit 52, which takes the difference between the attitude-representative signals and desired-attitude signals, which are stored in a memory 54. Attitude error signals are produced by circuit 52, which are applied directly to a proportional-integral-derivative (PID) controller 56, and indirectly through a differentiating (d/dt) circuit 58. While a PID controller is preferred, a PD or P controller may suffice. Controller 56 produces signals representative of the impulse demand relative to the roll, pitch and yaw axes which are required to correct the attitude. The impulse demand is summed with impulse biases, if appropriate, in a summer 60, and applied to the input ports of a geometric thruster selection logic block 62 and a pulse-width processing logic block 64, for purposes described below. The resulting pulse-width signals are applied to the drivers for the various selected thrusters, represented as a block 66.

Figure 2A:
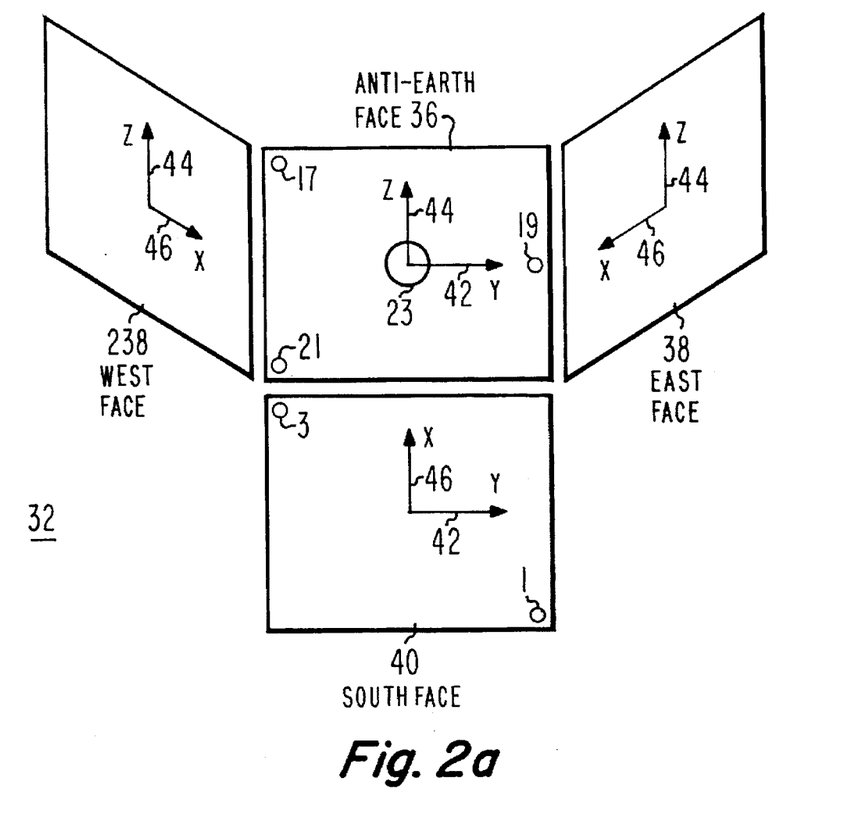
FIG. 2a is a simplified developed view of some of the faces of the spacecraft of FIG. 1, illustrating primary and secondary planes according to an embodiment of the invention, and a total of five attitude control thrusters to be controlled in accordance with an aspect of the invention.

FIG. 2a is a developed view of anti-Earth face 36, East face 38, South face 40, and a West face 238 of spacecraft A2100 of FIG. 1a, with the directions of the roll axis 2, the pitch axis 44, and the yaw axis 46 indicated for each face. As illustrated, anti-Earth face 36 of FIG. 2a has three associated thrusters 17, 19, and 21, which have their thrust axes extending approximately perpendicular to face 36 (perpendicular to the plane of FIG. 2a). South face 40 has two thrusters, 1 and 3, located at opposite corners. As illustrated, the anti-Earth face 36 also has a Delta-V thruster 23 which is not used for attitude control.

Each of the attitude control thrusters of FIG. 2a, when energized, creates a torque about the center of mass of the spacecraft. As mentioned above, the exact location of the center of mass may not be exactly known. The thruster torque direction depends upon the location of the thruster relative to the center of mass of the spacecraft, and on the thrust direction. According to an aspect of the invention, the attitude control thrusters have their torque vector directions lying in (or along) a primary plane or a secondary plane which is not parallel with the primary plane. A primary plane may be identified by selecting any thruster torque vector which lies in a plane, and determining whether the next adjacent thruster torque vector makes an angle of less than 180° in a CCW direction relative to the first torque vector. If all thrusters meet this criterion, then the plane may be selected as a primary plane. If two planes meet this criterion, then either may be a primary plane. The torque vector directions of thrusters 17, 19, and 21 of FIG. 2a are approximately along the anti-Earth face 36, which (together with all planes parallel thereto) may be viewed as the primary plane. Similarly, the torque vector directions of thrusters 1 and 3 lie in or along the South face 40, which (together with all planes parallel thereto) may be viewed as being the secondary plane. Consequently, thrusters 17, 19, and 21 are viewed as being primary thrusters, and thrusters 1 and 3 are viewed as being secondary thrusters. The invention requires only that the torque vector directions of all of the primary thrusters lie in the same plane (or in mutually parallel planes, because the point of action of the torque vector is not fixed). There are consequently no requirements placed on the thruster locations, or on their thrust directions, but only on their torque vector directions. It should be noted that if a thrust direction is normal to a plane, then its torque vector direction is necessarily in the plane, but the fact that a torque vector direction lies in a plane does not necessarily require that the thrust direction be normal to that plane.

Since the thrusters do not, in general, have torque vector directions which coincide with the roll, pitch and yaw axes, the impulse demand as generated by PID controller 56 of FIG. 1b must be transformed into an impulse demand along a set of three mutually orthogonal auxiliary axes, two of which lie in the primary plane, and a third of which is normal to the primary plane. The primary plane in the case of the thruster arrangement of FIG. 2a may be considered to be the plane of the anti-Earth face 36, and the secondary plane may be considered to be the plane of the South face 40. The transformation of axes is performed in geometric thruster selection logic block 62 of FIG. 1b.

Once the impulse demand is known relative to three auxiliary axes, two of which lie in the primary plane, and one of which is perpendicular thereto, one of the secondary thrusters 1 and 3 is selected in block 62 of FIG. 1b. The selected one of the secondary thrusters of the set {1,3} of secondary thrusters is the one whose torque vector component along the third auxiliary axis has the same sign as the transformed impulse demand along that axis. The augmented impulse demand in the primary plane is then calculated in geometric thruster selection logic block 62 of FIG. 1b by $$\begin{bmatrix} I_1 \\ I_2 \end{bmatrix}_{aug} = \begin{bmatrix} I_1 \\ I_2 \end{bmatrix} - \begin{bmatrix} T_{t1} \\ T_{t2} \end{bmatrix} \frac{I_3}{T_{t3}} \quad (4)$$

where:

$I_1$ is the component of the transformed impulse demand along the first auxiliary axis;

$I_2$ is the component of the transformed impulse demand along the second auxiliary axis;

$I_3$ is the component of the transformed impulse demand along the third auxiliary axis;

$T_{t1}$ is the torque vector along the first auxiliary axis of the selected secondary thruster;

$T_{t2}$ is the torque vector along the second auxiliary axis of the selected secondary thruster;

$T_{t3}$ is the torque vector along the third auxiliary axis of the selected secondary thruster; and the subscript "aug" identifies the augmented impulse demand matrix.

Figure 2B:
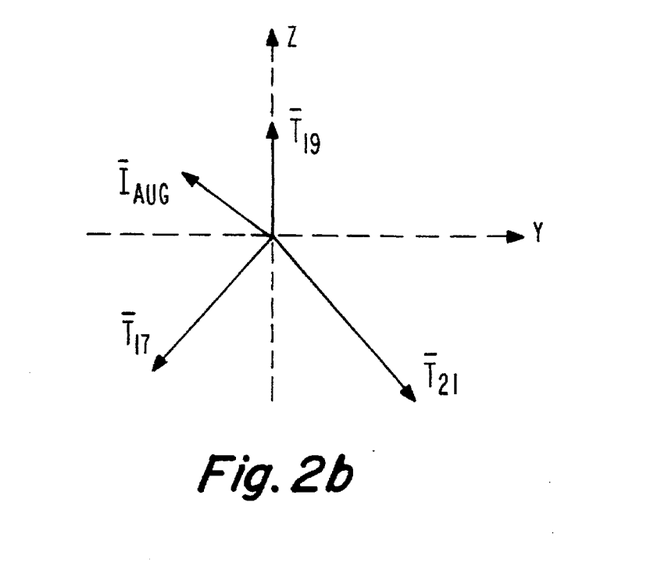
FIG. 2b is a diagram of the augmented impulse demand vector in the primary plane, together with other vectors.

The next step in determining which thrusters to operate for attitude control is the selection, in block 62 of FIG. 1b, of first and second "adjacent" primary thrusters of the set of primary thrusters. FIG. 2b represents the primary plane, which includes a vector $\bar{I}_{aug}$ representative of the augmented impulse demand, and which also includes torque vectors $\bar{T}_{17}, \bar{T}_{19}$, and $\bar{T}_{21}$, as defined above, representing the torques associated with the three primary thrusters 17, 19, and 21. The adjacent primary thrusters which are selected are those whose torques in the primary plane most closely bound the augmented impulse demand in the primary plane. The bounding is readily determined by proceeding both clockwise (CW) and counterclockwise (CCW) from the impulse demand vector; the first thruster torque vector to be encountered is the bounding vector for that particular direction. Thus, in FIG. 2b, vectors $\bar{T}_{17}$ and $\bar{T}_{19}$ are the CW and CCW bounds, respectively.

Once the secondary and adjacent primary thrusters have been identified as described above, signals representing the thrusters and the thruster torques which are required for attitude control are applied from block 62 of FIG. 1b to pulse-width processing logic block 64, in which pulse widths are determined for the first and second adjacent primary thrusters and the selected secondary thruster(s) to produce the impulse demand. The impulse demand is determined by $$\begin{bmatrix} PW_f \\ PW_s \\ PW_t \end{bmatrix} = M^{-1} \begin{bmatrix} I_1 \\ I_2 \\ I_3 \end{bmatrix} \quad (5)$$

where;

$PW_f$ is the pulse width of the selected first adjacent primary thruster;

$PW_s$ is the pulse width of the selected second adjacent primary thruster;

$PW_t$ is the pulse width of the selected secondary thruster;

$M^{-1}$ is the inverse of matrix M, and matrix M is given by $$M = \begin{bmatrix} T_{f1} & T_{s1} & T_{t1} \\ T_{f2} & T_{s2} & T_{t2} \\ T_{f3} & T_{s3} & T_{t3} \end{bmatrix} \quad (6)$$

where the first column of matrix M is the torque of the selected first primary adjacent thruster along the first, second and third auxiliary axes, the second column matrix M is the torque of the selected second adjacent primary thruster along the first, second and third auxiliary axes, and the third column of matrix M is the torque of the selected secondary thruster along the first, second and third auxiliary axes. The resulting pulse widths are applied to thruster drivers illustrated as a block 66 of FIG. 1b, to effect the desired attitude control.

Figure 3A:
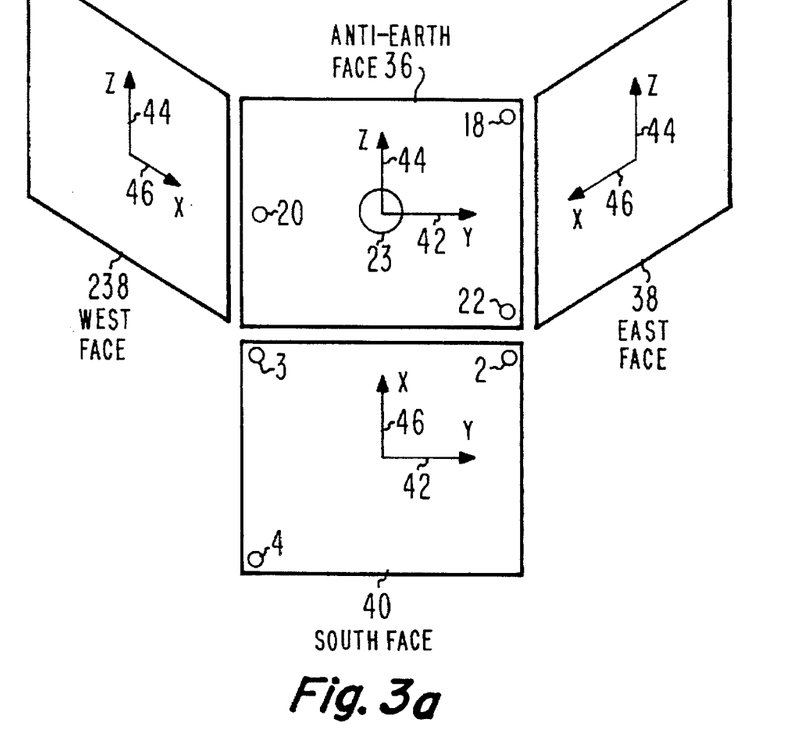
FIG. 3a is a simplified developed view of some of the faces of the spacecraft of FIG. 1, illustrating primary and secondary planes according to an embodiment of the invention, and a total of six attitude control thrusters to be controlled in accordance with an aspect of the invention.

FIG. 3a is a developed view of spacecraft A2100 of FIG. 1a which is similar to that of FIG. 2a. As mentioned above, a primary plane may be identified by selecting any thruster torque vector which lies in the plane, and determining whether the next adjacent thruster torque makes an angle of less than 180° in a CCW direction relative to the first torque vector. If all thrusters meet this criterion, then the plane may be selected as a primary plane. If two planes meet this criterion, then either may be a primary plane. As illustrated in FIG. 3a, anti-Earth face 36 of FIG. 3a bears three associated thrusters 18, 20, and 22, which have their torque vector axes extending parallel to face 36, which, as in the case of FIG. 2a, may be viewed as being the primary plane. Primary thrusters 18 and 22 are adjacent to East face 38, and primary 20 is adjacent West face 238. South face 40 has three secondary thrusters 2, 3, and 4, with their torque vector directions parallel to face 40. Face 40 may be viewed as a secondary plane. Secondary thruster 2 is located adjacent to (at the same corner as) primary thruster 22, secondary thruster 4 diagonally opposite to secondary thruster 2 and adjacent to West face 238, and secondary thruster 3 adjacent to West face 238. In the arrangement of FIG. 3a, the South face cannot be selected as being primary, because the angle between the torque of thruster 4 and that of thruster 2 is 180°, not <180°.

Figure 3B:
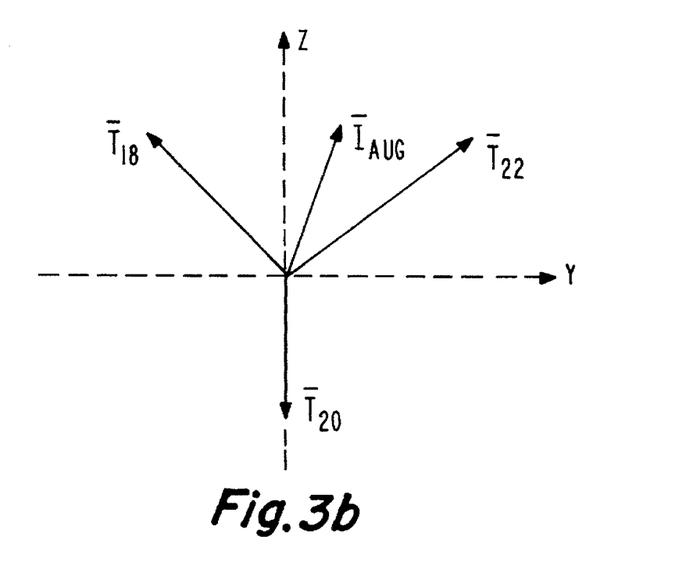
FIG. 3b is a diagram of the augmented impulse demand vector in the primary plane, together with other vectors.

In operation of the attitude control system of FIG. 1b with the thruster layout of FIG. 3a, all the calculations are performed as described above in conjunction with FIGS. 2a and 2b. The selected secondary thruster in the arrangement of FIG. 3a is thruster 2 (assuming that $I_3$, the impulse demand along the third auxiliary axis, which also happens to be the yaw axis, is positive), and the resulting augmented impulse demand and primary thruster torques in the primary plane are as illustrated in FIG. 3b, in which $\bar{I}_{aug}$ designates the augmented impulse demand, and $\bar{T}_{18}, \bar{T}_{20}$, and $\bar{T}_{22}$ designate the torques of thrusters 18, 20, and 22, respectively, projected onto the primary plane. From FIG. 3b, thrusters 18 and 22 are selected as adjacent thrusters, because their torques most closely bound vector $\bar{I}_{aug}$. Consequently, thrusters 18 and 22 are the selected primary thrusters, and thruster 2 is the selected secondary thruster. Thrusters 2, 18, and 22 are fired with a pulse width calculated as above for attitude control.

Figure 4A:
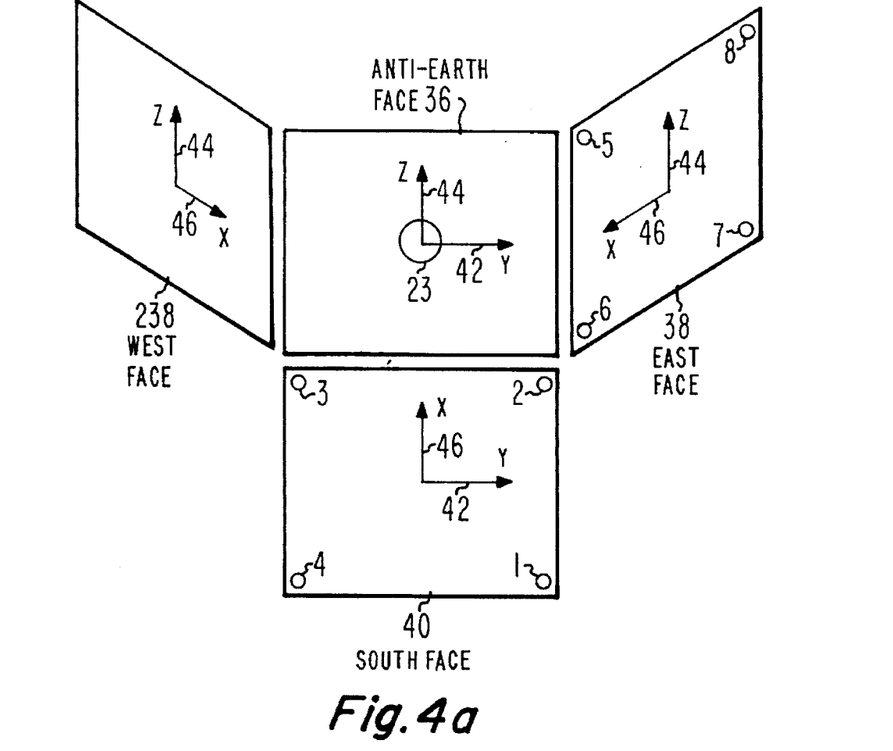
FIG. 4a is a simplified developed view of some of the faces of the spacecraft of FIG. 1, illustrating primary and secondary planes according to an embodiment of the invention, and a total of eight attitude control thrusters to be controlled in accordance with an aspect of the invention.

FIG. 4a is a developed view of spacecraft A2100 of FIG. 1a which is similar to that of FIG. 2a. As illustrated, anti-Earth face 36 of FIG. 4a has no thrusters. East face 38 has four associated thrusters 5, 6, 7, and 8, which have torque vector directions parallel to face 38, and South face 40 has four associated thrusters 1, 2, 3, and 4, which have torque vector directions parallel to face 40. Either face 38 or face 40 may be viewed as being the primary plane on which four principal thrusters are located, and face 38 is arbitrarily selected. South face 40 is therefore the secondary plane. Primary thruster 5 is adjacent anti-Earth face 36 and the north face (not illustrated), primary thruster 6 is adjacent to anti-Earth face 36 and South face 40, and primary thrusters 7 and 8 are approximately diagonally opposite to thrusters 5 and 6, respectively. As mentioned, South face 40 has four secondary thrusters 1, 2, 3, and 4, with secondary thruster 2 located adjacent to (at the same corner as) primary thruster 6, secondary thruster 4 located diagonally opposite to secondary thruster 2 and adjacent to West face 238, and secondary thruster 3 located adjacent to anti-Earth face 36 and West face 238. Thruster 1 is diagonally opposite to thruster 3. It is quite apparent from FIG. 4a that the primary thrusters have their torque vector directions on or along a single primary plane, and that the secondary thrusters have their torque vector directions on or along another plane, which is orthogonal (and therefore nonparallel) to the primary plane.

Figure 4B:
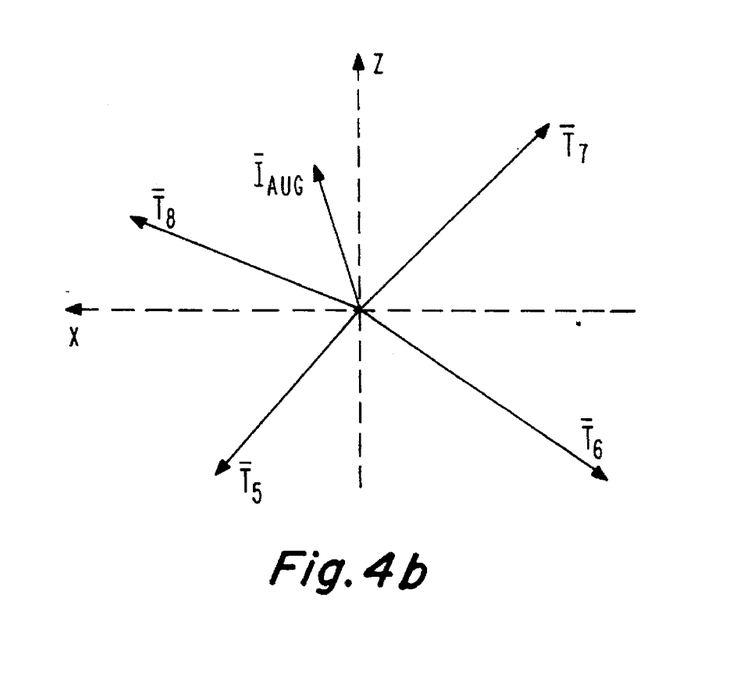
FIG. 4b is a diagram of the augmented impulse demand vector in the primary plane, together with other vectors.

In operation of the attitude control system of FIG. 1b with the thruster layout of FIG. 4a, all the calculations are performed as described above. The selected secondary thruster is thruster 2, assuming that the impulse demand along the third auxiliary axis (the Y axis of the spacecraft) is negative, and the torque of thruster 2 along the negative Y axis is larger than that of thruster 3. The resulting augmented impulse demand and principal thruster torques in the primary plane are as illustrated in FIG. 4b, in which $\bar{I}_{aug}$ designates the augmented impulse demand, and $\bar{T}_5$, $\bar{T}_6$, $\bar{T}_7$, and $\bar{T}_8$ designate the torques of thrusters 5, 6, 7, and 8, respectively, projected onto the primary plane. From FIG. 4b, thrusters 8 and 7 are selected as adjacent thrusters, because their torques most closely bound vector $\bar{I}_{aug}$. Consequently, thrusters 8 and 7 are the selected primary thrusters, and thruster 2 is the selected secondary thruster. Thrusters 2, 8, and 7 are fired with a pulse width calculated as above for attitude control.

Figure 5A:
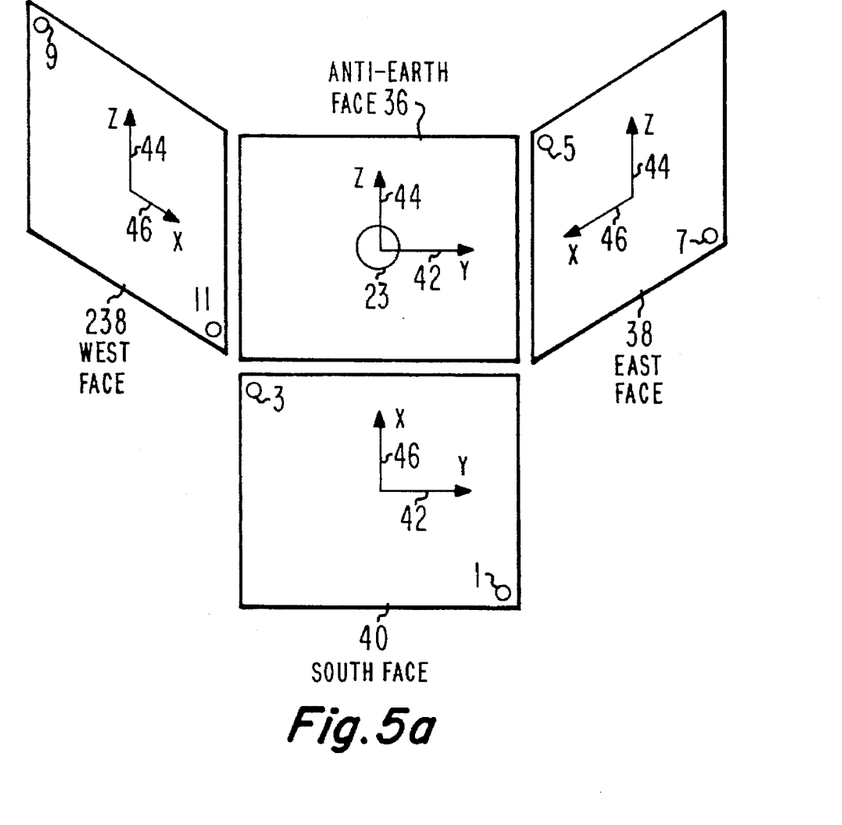
FIG. 5a is a simplified developed view of some of the faces of the spacecraft of FIG. 1, illustrating primary and secondary planes according to an embodiment of the invention, and a total of six attitude control thrusters to be controlled in accordance with an aspect of the invention, distributed in a manner different from that of FIG. 2a, and FIG. 5b is a diagram of the augmented impulse demand vector in the primary plane, together with other vectors.

FIG. 5a is a developed view of spacecraft A2100 of FIG. 1a which is similar to that of FIG. 2a. As illustrated, anti-Earth face 36 of FIG. 5a has no thrusters. East face 38 has two associated thrusters 5 and 7, which have their torque vector direction along face 38. West face 238 also has two associated thrusters 9 and 11, with their torque directions along face 238, and hence along parallel face 38. Face 38 may be viewed as being the primary plane. Primary thruster 5 is adjacent anti-Earth face 36 and the north face (not illustrated), primary thruster 11 is adjacent to anti-Earth face 36 and South face 40, and primary thrusters 7 and 9 are diagonally opposite to thrusters 5 and 11, respectively. South face 40 has two thrusters, 1 and 3, located at diagonally opposite corners, with thruster 1 adjacent thruster 7 on the East face, and with thruster 2 adjacent thruster 11 on the West face 238. The torque vector directions of thrusters 1 and 3 lie along South face 40, and South face 40 may be viewed as a secondary plane.

Figure 5B:
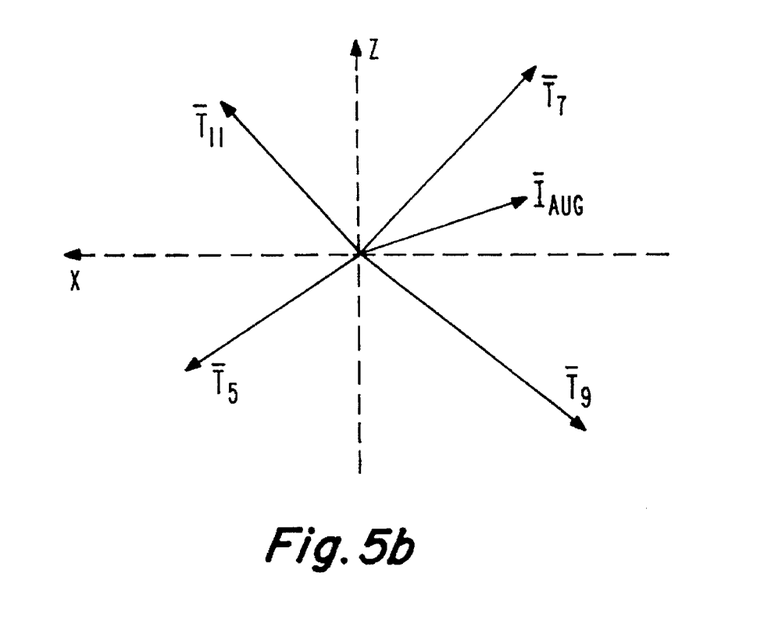

In operation of the attitude control system of FIG. 1b with the thruster layout of FIG. 5a, all the calculations are performed as described above. The selected secondary thruster is thruster 1, assuming that the impulse demand along the third auxiliary axis (the Y-axis of the spacecraft, in this case) is positive, and the resulting augmented impulse demand and primary thruster torque vectors in the primary plane are as illustrated in FIG. 5b. In FIG. 5b, $\bar{I}_{aug}$ designates the augmented impulse demand, and $\bar{T}_5$, $\bar{T}_7$, $\bar{T}_9$, and $\bar{T}_{11}$ designate the torques of thrusters 5, 7, 9, and 11, respectively, projected onto the primary plane. From FIG. 5b, thrusters 7 and 9 are selected as adjacent thrusters, because their torques most closely bound vector $\bar{I}_{aug}$. Consequently, thrusters 7 and 9 are the selected primary thrusters, and thruster 1 is the selected secondary thruster. Thrusters 1, 7, and 9 are fired with a pulse width calculated as above for attitude control.

Other embodiments of the invention will be apparent to those skilled in the art. For example, while chemical thrusters are described, the same principles apply to arcjets, ion thrusters, and other mass ejection torquers. Those skilled in the art recognize that the illustrated planar faces of the spacecraft are idealized or conceptual, and the actual spacecraft may not have the physical appearance of planar faces. While the invention is directed toward a situation in which the torque vector directions of the primary thrusters lie approximately in a plane, it is sufficient that the torque vector directions of the primary thrusters lie in mutually parallel planes, which may be viewed as being a single plane for this purpose.

What is claimed is:

1. A method for attitude control of a spacecraft, said spacecraft having at least five attitude control thrusters located in a manner such that a first set of at least three primary ones of said thrusters have their torque vector directions lying approximately in a primary plane, and the remaining attitude control thrusters, constituting a set of secondary thrusters, have their torque vector directions lying approximately in a second plane which is nonparallel with said primary plane, said method comprising the steps of:

sensing the current attitude of said spacecraft, to produce attitude-representative signals;

generating desired attitude signals representing the desired attitude of said spacecraft;

taking the difference between said attitude-representative and said desired attitude signals, to produce attitude error signals;

applying said attitude error signals to a controller having at least a proportional characteristic, for generating impulse demand signals representing impulse demand along each of three mutually orthogonal principal axes;

transforming the components of said impulse demand along said three principal axes into an impulse demand along a set of three mutually orthogonal auxiliary axes, two of which lie in said primary plane, and a third of which is normal to said primary plane;

selecting one of said thrusters of said set of secondary thrusters which has, along said third auxiliary axis, a torque component with the same sign as said transformed impulse demand along said third auxiliary axis;

calculating augmented impulse demand in said primary plane by $$\begin{bmatrix} I_1 \\ I_2 \end{bmatrix}_{aug} = \begin{bmatrix} I_1 \\ I_2 \end{bmatrix} - \begin{bmatrix} T_{t1} \\ T_{t2} \end{bmatrix} \frac{I_3}{T_{t3}}$$

where:

$I_1$ is the component of the transformed impulse demand along the first auxiliary axis;

$I_2$ is the component of the transformed impulse demand along the second auxiliary axis;

$I_3$ is the component of the transformed impulse demand along the third auxiliary axis;

$T_{t1}$ is the torque along the first auxiliary axis of the selected secondary thruster;

$T_{t2}$ is the torque along the second auxiliary axis of the selected secondary thruster; and $T_{t3}$ is the torque along the third auxiliary axis of the selected secondary thruster; and the subscript "aug" identifies the augmented impulse demand matrix;

selecting first and second adjacent primary thrusters of said set of primary thrusters, said selected adjacent primary thrusters being those whose torque vectors in said primary plane most closely bound said augmented impulse demand in said primary plane;

calculating the pulse widths required for said first and second adjacent primary thrusters and said selected secondary thrusters to produce said impulse demand, according to $$\begin{bmatrix} PW_f \\ PW_s \\ PW_t \end{bmatrix} = M^{-1} \begin{bmatrix} I_1 \\ I_2 \\ I_3 \end{bmatrix}$$

where;

$PW_f$ is the pulse width of the selected first adjacent primary thruster;

$PW_s$ is the pulse width of the selected second adjacent primary thruster;

$PW_t$ is the pulse width of the selected secondary thruster;

$M^{-1}$ is the inverse of matrix M, and matrix M is given by $$M = \begin{bmatrix} T_{f1} & T_{s1} & T_{t1} \\ T_{f2} & T_{s2} & T_{t2} \\ T_{f3} & T_{s3} & T_{t3} \end{bmatrix}$$

where the first column of matrix M is the torque vector of the selected first primary adjacent thruster along the first, second and third auxiliary axes, the second column matrix M is the torque vector of the selected second adjacent primary thruster along the first, second and third auxiliary axes, and the third column of matrix M is the torque vector of the selected secondary thruster along the first, second and third auxiliary axes; and applying the calculated pulse widths to said selected first and second primary thrusters and to said selected secondary thruster for torquing said spacecraft for attitude control.

2. A spacecraft according to claim 1, wherein the number of thrusters in said primary plane is four, and the number of thrusters in said secondary plane is two.

3. A method according to claim 1, wherein the number of thrusters in said secondary plane is at least three.

4. A method according to claim 1, wherein said step of applying said attitude error signals to a controller, includes the step of generating impulse demand signals relative to roll, pitch, and yaw axes.

* * * * *